United States Patent
Dutta et al.

(10) Patent No.: US 8,924,392 B2
(45) Date of Patent: Dec. 30, 2014

(54) CLUSTERING-BASED RESOURCE AGGREGATION WITHIN A DATA CENTER

(75) Inventors: Debojyoti Dutta, Santa Clara, CA (US); Subrata Banerjee, Los Altos, CA (US); Ethan M. Spiegel, Mountain View, CA (US); Arpan K. Ghosh, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 13/113,141

(22) Filed: May 23, 2011

(65) Prior Publication Data

US 2012/0303618 A1 Nov. 29, 2012

(51) Int. Cl.
G06F 17/30 (2006.01)
H04L 29/08 (2006.01)

(52) U.S. Cl.
CPC ............ *H04L 67/1097* (2013.01); *H04L 67/10* (2013.01)
USPC .......................................... 707/738; 707/748

(58) Field of Classification Search
USPC .............. 707/737, 822, 828, 999.2, 738, 748, 707/749, 752, 754; 709/207, 223, 237
See application file for complete search history.

(56) References Cited

U.S. PATENT DOCUMENTS

| | | | |
|---|---|---|---|
| 7,457,835 B2 | 11/2008 | Toebes et al. | |
| 7,543,020 B2 | 6/2009 | Walker et al. | |
| 7,634,566 B2 | 12/2009 | Turner et al. | |
| 7,747,720 B2 | 6/2010 | Toebes et al. | |
| 7,752,311 B2 | 7/2010 | Walker et al. | |
| 7,870,420 B2 | 1/2011 | Lloyd et al. | |
| 8,392,927 B2 * | 3/2013 | Rolia et al. | 718/104 |
| 8,533,281 B2 * | 9/2013 | Bodin et al. | 709/207 |
| 2005/0283645 A1 | 12/2005 | Turner et al. | |
| 2006/0179106 A1 | 8/2006 | Turner et al. | |
| 2007/0260716 A1 * | 11/2007 | Gnanasambandam et al. | 709/223 |
| 2009/0287825 A1 | 11/2009 | Walker et al. | |
| 2010/0223382 A1 | 9/2010 | Rayes et al. | |
| 2010/0250668 A1 | 9/2010 | Toebes et al. | |
| 2011/0072153 A1 * | 3/2011 | Candelaria et al. | 709/237 |
| 2011/0106950 A1 * | 5/2011 | Schlack | 709/226 |

OTHER PUBLICATIONS

Detecting Anomalies by Data Aggregation in the Power Grid, Nguyen, Hoang et al., University of Illinois, Computer Science Research and Tech Reports, Jul. 2006.

* cited by examiner

*Primary Examiner* — Marc Filipczyk
(74) *Attorney, Agent, or Firm* — Edell, Shapiro & Finnan, LLC (57) ABSTRACT

Data representing capabilities of devices in a data is aggregated on a cluster-basis. Information representing capability attributes of devices in the data center is received. The information representing the capability attributes is analyzed to generate data that groups devices based on similarity of at least one capability attribute. Aggregation data is stored that represents the grouping of the devices based on similarity of the at least one capability attribute and identifies the devices in corresponding groups.

14 Claims, 6 Drawing Sheets

CLUSTERING-BASED RESOURCE AGGREGATION WITHIN A DATA CENTER

TECHNICAL FIELD

The present disclosure relates to cloud computing systems.

BACKGROUND

"Cloud computing" can be defined as Internet-based computing in which shared resources, software and information are provided to client or user computers or other devices on-demand from a pool of resources that are available via the Internet, or other electronic network. Cloud computing is envisioned as a way to allocate access to resources and services, allowing users efficiently purchase as many resources as they need and/or can afford.

In some implementations, cloud computing comprises linking backend resources (e.g., memory, processors, etc.) to provide web-based services, applications, and data storage. This approach has the potential effect of providing services at lower cost than current options, and with less complexity, greater scalability, and wider reach. However, linking the capabilities of such backend systems to each other and to client or user devices can be daunting, especially in view of the fact that there may be many thousands of such backend systems, clients and users, each having different capabilities, attributes and needs.

DESCRIPTION OF EXAMPLE EMBODIMENTS

Overview

Data representing capabilities of devices in a data center is aggregated on a cluster-basis. Information representing capability attributes of devices in the data center is received. The information representing the capability attributes is analyzed to group devices based on similarity of at least one capability attribute. Aggregation data is stored that represents the grouping of the devices based on similarity of the at least one capability attribute and identifies the devices in corresponding groups.

Example Embodiments

Figure 1:
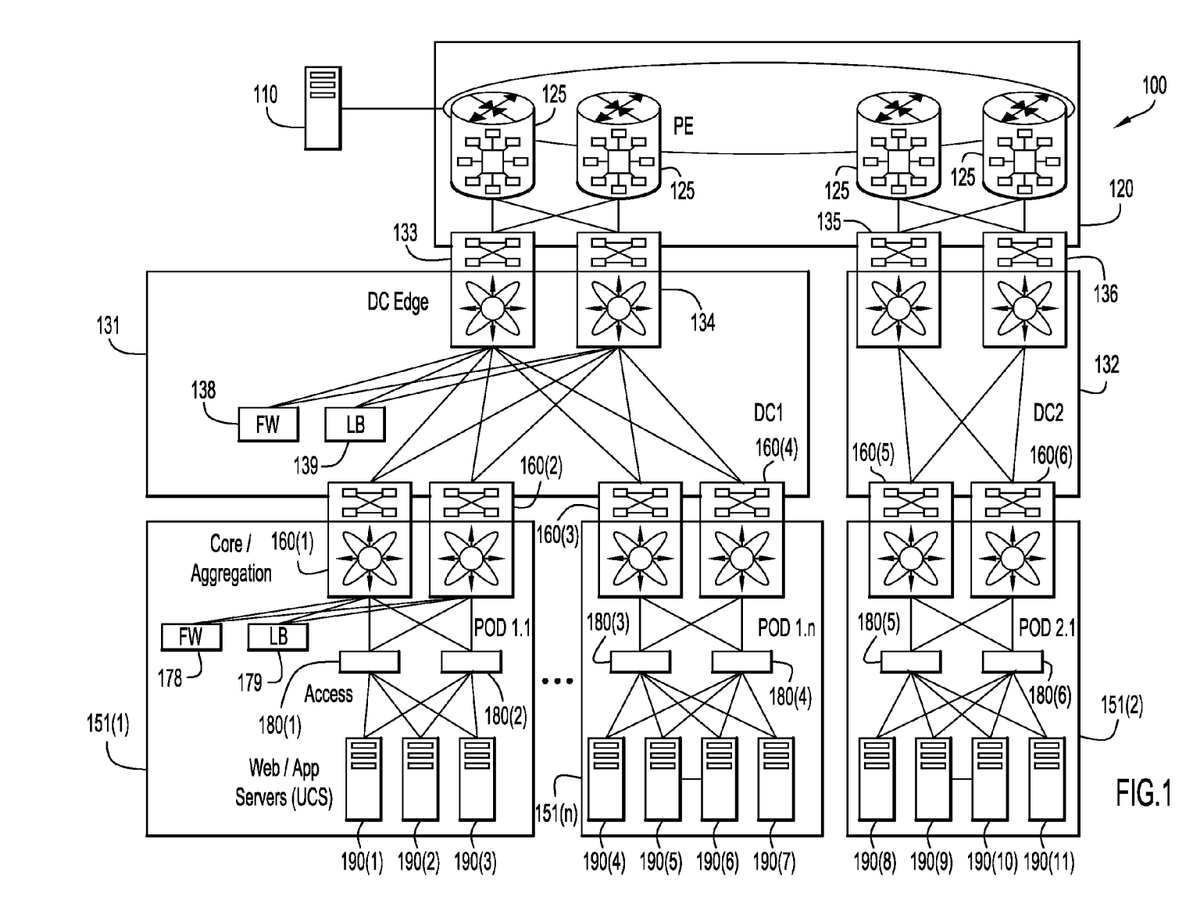
FIG. 1 is a block diagram of a cloud computing system that is configured to support a clustering-based resource aggregation process for capabilities of data center devices.

FIG. 1 depicts a schematic diagram of a cloud computing system network topology 100 that operates in accordance with the clustering-based resource aggregation techniques described herein. A top level network 120 interconnects a plurality of routers 125. Some of these routers 125 may be Provider Edge routers that enable connectivity to Data Centers 131, 132 via Data Center (DC) Edge routers 133, 134, 135, 136. Other routers 125 may be employed exclusively internally to top level network 120 as "core" routers, in that they may not have direct visibility to any DC Edge router.

Each Data Center 131, 132 (and using Data Center 131 as an example) may comprise DC Edge routers 133, 134 (as mentioned), a firewall 138, and a load balancer 139. These elements operate together to enable "pods" 151(1)-151(n), 152(1), etc., which respectively include multiple cloud resource devices 190(1)-190(3), 190(4)-190(7), 190(8)-190(11), to communicate effectively through the network topology 100 and provide computing and storage services to, e.g., clients 110, which may be other Data Centers or even stand alone computers. In a publish-subscriber system, which is one way to implement such a cloud computing environment, clients 110 are subscribers to requested resources and the cloud resource devices 190(1)-190(3), 190(4)-190(7), 190(8)-190(11) (which publish their services, capabilities, etc.) are the ultimate providers of those resources, although the clients themselves may have no knowledge of which specific cloud resource devices actually provide the desired service (e.g., compute, storage, etc.).

Still referring to FIG. 1, each Data Center pod, e.g., 151(1), may comprise one or more aggregation nodes 160(1), 160(2), etc. that are in communication with the multiple cloud resource devices 190 via access switches 180(1), 180(2), as may be appropriate. A firewall 178 and load balancer 179 may also be furnished for each pod 151 to ensure security and improve efficiency of connectivity with upper layers of network topology 100.

Figure 2:
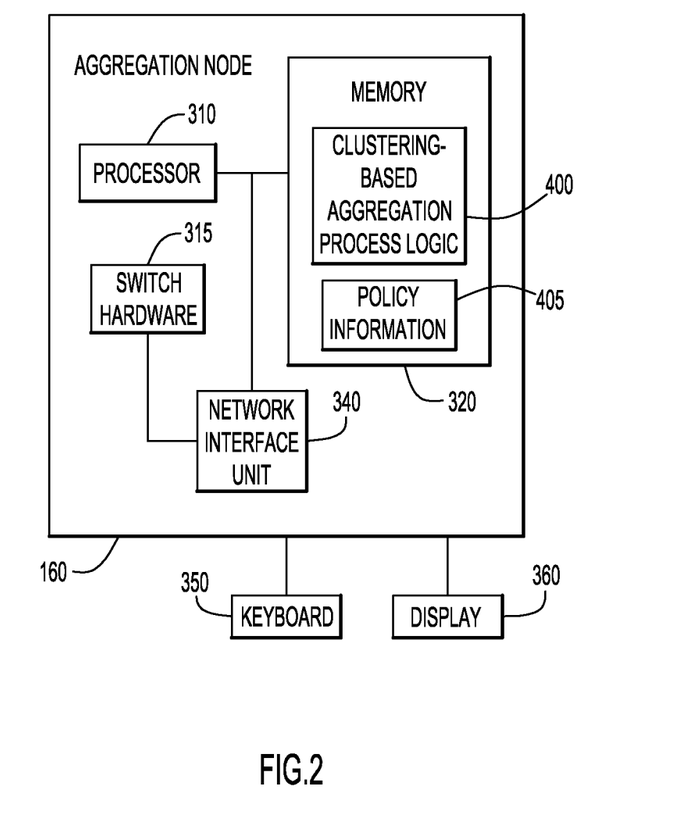
FIG. 2 is a block diagram for an aggregation node, such as an edge device, that performs the clustering-based resource aggregation process.

FIG. 2 depicts an example aggregation node 160 that comprises a processor 310, associated memory 320 that stores instructions for clustering-based aggregation process logic 400 and a network interface unit 340, such as a network interface card. Switch hardware 315 may also be included. Switch hardware 315 comprises one or application specific integrated circuits and supporting circuitry to buffer/queue incoming packets and route the packets over a particular port to a destination device. The switch hardware 315 may include its own processor that is configured to apply class of service, quality of service and other policies to the routing of packets. Aggregation node 160 may also be accessible via input/output functionality including functions supported by, e.g., a keyboard 350 and display 360 to enable direct control of a given aggregation node 160.

The processor 310 may comprises one or more programmable processors (microprocessors or microcontrollers) or fixed-logic processors. In the case of a programmable processor, any associated memory (e.g., memory 320) may be of any type of tangible processor readable memory (e.g., random access, read-only, etc.) that is encoded with or stores instructions that can implement the clustering-based aggregation process logic 400. The memory 320 also stores policy information 505 that is evaluated to determine parameters used by the process logic 400 when clustering capability attributes for devices. As explained hereinafter, the policy information is used to select one or more of: the attributes to be used for grouping devices, similarity/distance metrics to be used for grouping of devices, the clustering algorithm to be used for grouping and relative weights to be placed on attributes for grouping. The policy information 405 used to select these parameters may be pre-stored, updated or entered by a user at any time.

The processor 310 may comprise a fixed-logic processing device, such as an application specific integrated circuit (ASIC) or digital signal processor that is configured with firmware comprised of instructions or logic that cause the processor to perform the functions described herein. Thus, clustering-based process logic 400 may be encoded in one or more tangible computer readable storage media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor or computer readable medium that is encoded with instructions for execution by a processor that, when executed by the processor, are operable to cause the processor to perform the functions described herein.

Modern cloud data centers have an extremely large number of resources, e.g., compute, storage and network devices, also referred to herein as resources. Detailed data about the capabilities of these resources is useful for purposes of management, accurate visualization and for provisioning service requests in a manner that is optimal to both the customer and the cloud service provider. Aggregation of resource attributes can reduce the amount of data needed to track the capabilities of devices in the cloud computing system. Many of the resources in the data center have similar capabilities and similar health or status of those capabilities can be grouped together to provide an accurate aggregate view of the data center.

The clustering-based aggregation process involves grouping data center resources with similar capabilities into clusters or groups to efficiently represent the capabilities of a group of like resources. The cluster-based aggregation process allows a user, i.e., a network administrator associated with the cloud computing system, to specify which attributes of the resources should be considered for clustering purposes, and also allows the user to specify the number of clusters. The clustering-based aggregation process may be performed to calculate the groups or clusters each time a service request is provisioned and/or the properties of a resource change.

Figure 3:
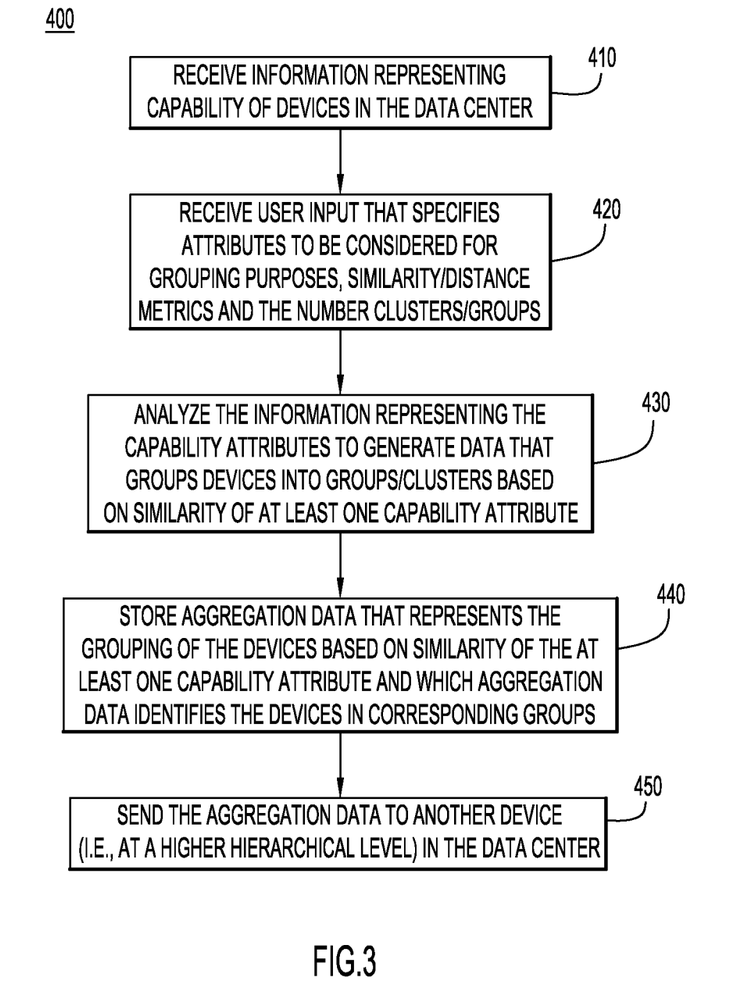
FIG. 3 is a flow chart showing examples of operations associated with the clustering-based resource aggregation process.
Figure 4:
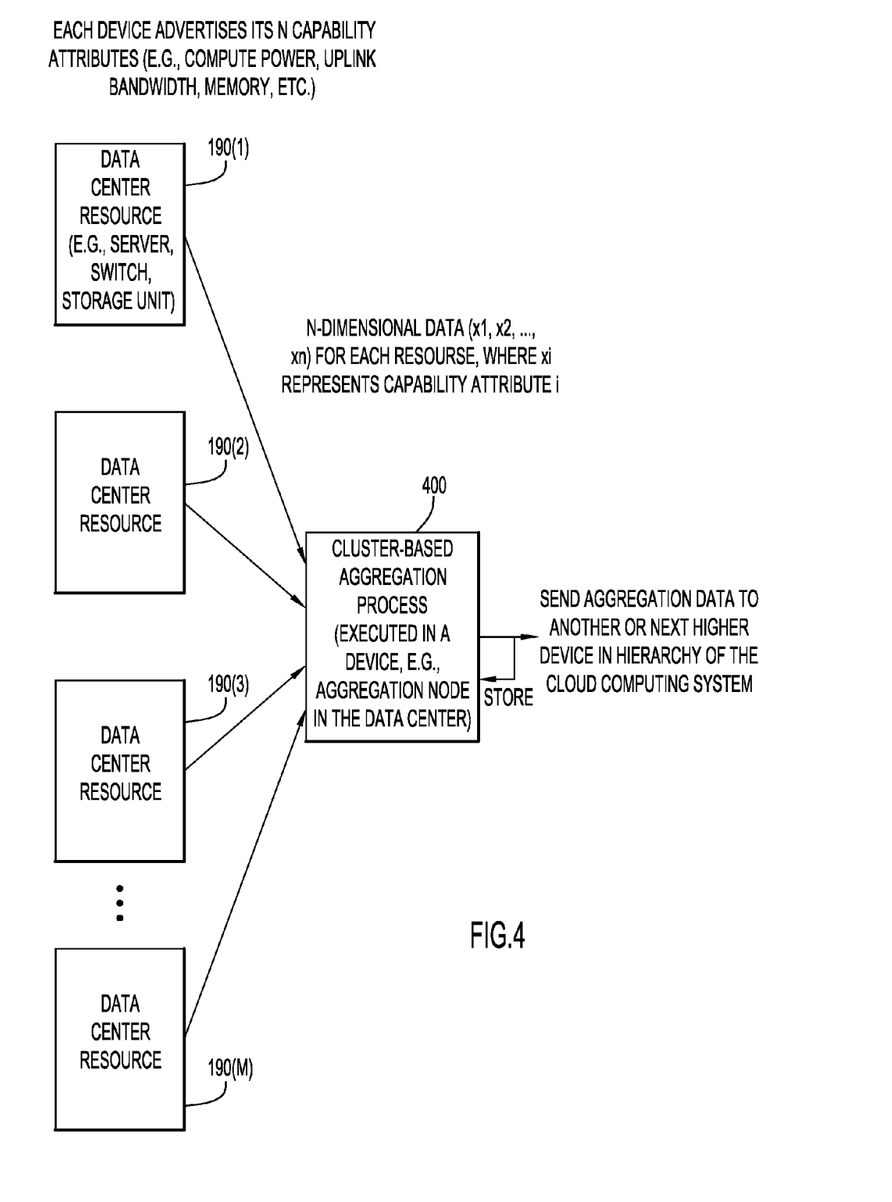
FIG. 4 is a diagram that generally depicts the operations of the clustering-based resource aggregation process.

Reference is now made to FIGS. 3 and 4 for a description of the clustering-based aggregation process logic 400. At 410, information is received that represents the capability attributes of devices in the data center. This information may be received by advertising messages sent from devices in a data center to an aggregation node 160, as depicted in FIG. 1. The information representing the capability attributes of devices in the data center may be received in real-time. That is, as the capability attributes for a device changes, the device sends information representing the latest/updated capability attribute. For example, all of the servers 190 in a data center send messages to the aggregation node for that data center. Similarly, all of the access switches, firewall devices, load balancers, storage devices, etc., send messages containing capability attributes to the aggregation node for that data center. As an example, the capability attributes for servers may include: uplink bandwidth (committed information rate), number of processing cores, processor unit utilization, available memory, hypervisor type, rack identifier, power consumption, amount of local storage availability, etc. These capability attributes may vary over time depending on the workload of the data center resources. A variety of techniques may employed for the aggregation node to receive information containing capability attributes of data center resources for purposes of cluster-based aggregation, including publish-subscribe, resource allocation, visualization, etc.

As shown in FIG. 4, the capabilities of like devices, e.g., compute devices, are represented by N capability attributes (e.g., compute power, uplink bandwidth, available memory, etc.) and the N-dimensional data for each resource is collected at the aggregation node or other cloud device where the cluster-based aggregation process 400 is executed. Similarly, the capabilities of other like devices, e.g., switches, firewalls, storage devices, etc., is collected at the aggregation node where the cluster-based aggregation process 400 is performed.

At 420, user input is received, e.g., from a network administrator, that specifies which one or more attributes to use for grouping devices into clusters based on similarity of the one or more attributes, the similarity/distance metrics to be used for clustering, the clustering algorithm to be used, relative weights to be placed on certain attributes, and the number of clusters/groups or other clustering algorithm-specific parameters to be used. In the alternative, configurations may be set to perform cluster-based aggregation using the policy information 405 (FIG. 2) to select the attributes to be used for clustering, the similarity/distance metrics, the clustering algorithm to be used and the number of clusters/groups. Operation 420 may be performed at any time and the order of the operations shown in FIG. 3 is not meant to be limiting. The value of "N" is user-configurable depending on what attributes to be considered when grouping the resources. The user can also enter input to assign relative weights to the different attributes, giving some attributes more importance than others. Again, operation 420 may involve evaluating stored policy information to select one or more of: the attributes to be used for grouping devices, similarity/distance metrics to be used for grouping of devices, the clustering algorithm to be used for grouping and relative weights to be placed on attributes for grouping.

At 430, the information representing the capability attributes of the data center resources is analyzed to generate data that groups devices into groups/clusters based on similarity of at least one capability attribute. As explained above in connection with operation 410, data center resources (network, compute and storage) having the a common set of types of capability attributes (e.g., compute power, uplink bandwidth, memory, etc.) can be represented in an N-dimensional space. The data representing each of the plurality of capability attributes is analyzed to group devices that have a common set of capability attributes. In other words, the capability attributes for compute devices are analyzed for cluster-based aggregation, the capability attributes for network devices (switches, firewalls, load-balancers) are analyzed for cluster-based aggregation and the capability attributes for storage devices (e.g., storage arrays) are analyzed for cluster-based aggregation, etc.

Any of a variety of clustering algorithms now known or hereinafter developed may be used at operation 430 to group the attributes data. Examples of clustering algorithms include K-means (K-center) clustering, fuzzy clustering, quality threshold (QT) clustering and locality-sensitive clustering. In general, the clustering algorithm employed groups devices into groups based on distances between vectors representing the plurality of capability attributes for respective devices, i.e., resource instances. For example, K-center clustering is used to group the N-dimensional attributes data into K groups based on the similarity of their attributes. K-center clustering is a technique to group capabilities attribute data into K-clusters in such a way that maximum cluster size is minimized.

Every resource instance Z to be considered for a clustering process is represented by a N-dimensional data point $(x1, x2, \ldots, xn)$ as shown in FIG. 4. Each dimension is an attribute based on which the clustering is performed. In one example, clustering-based aggregation works as follows. A data point is selected at random and inserted into the set of centers C for clusters $C_i (i=1, \ldots, K)$, $C=C+Z$. A point Y farthest from all points in C is then found, $C=C+Y$. To find the farthest point, the distance between the feature vector for each point is determined. For this step, a "brute force" method is to go through all the points in cluster C and all the points in the data set. This process is repeated K−1 times until K centers are found, each center representing a corresponding cluster or group.

Capability attribute data for resources are assigned to cluster centers by determining the pairwise distance between the capability attribute for the resource and all of the centers to find the minimum. The distance may be referred to as the radius r. The capability attribute data for all resources is assigned to one of the clusters in this manner (based on the minimum distance to the cluster centers). The information representing the capability attributes may be analyzed to group devices based on the similarities of two or more capability attributes.

As an example, firewall devices in a data center are grouped into three groups or clusters:
Group 1: High bandwidth available
Group 2: ~50% of bandwidth available
Group 3: Low bandwidth available In this example, K is 3 and bandwidth may be the only attribute considered or is an attribute that is highly weighted among all the firewall attributes considered for the clustering-based aggregation. If the number of firewall rules are available, then a two-dimensional clustering-based aggregation space results.

The grouping of resources to different clusters results in a set of data, referred to herein as "aggregation data" and the aggregation data represents the grouping of data center devices based on similarity of at least one capability attribute. The aggregation data also identifies the devices in corresponding groups or clusters. The aggregation data is stored at operation 440, i.e., in memory of the device that performs the clustering-based aggregation or in the memory of one or more other devices in the data center. At 450, the aggregation data may be sent to one or more other devices, i.e., a device in a higher hierarchical level in the data center. As explained above, the operations 410-450 may be performed in an aggregation switch device in the data center, and may be executed in response to receiving a service request for provisioning in the data center or when operational properties (capabilities) of a device in the data center change.

Figure 5:
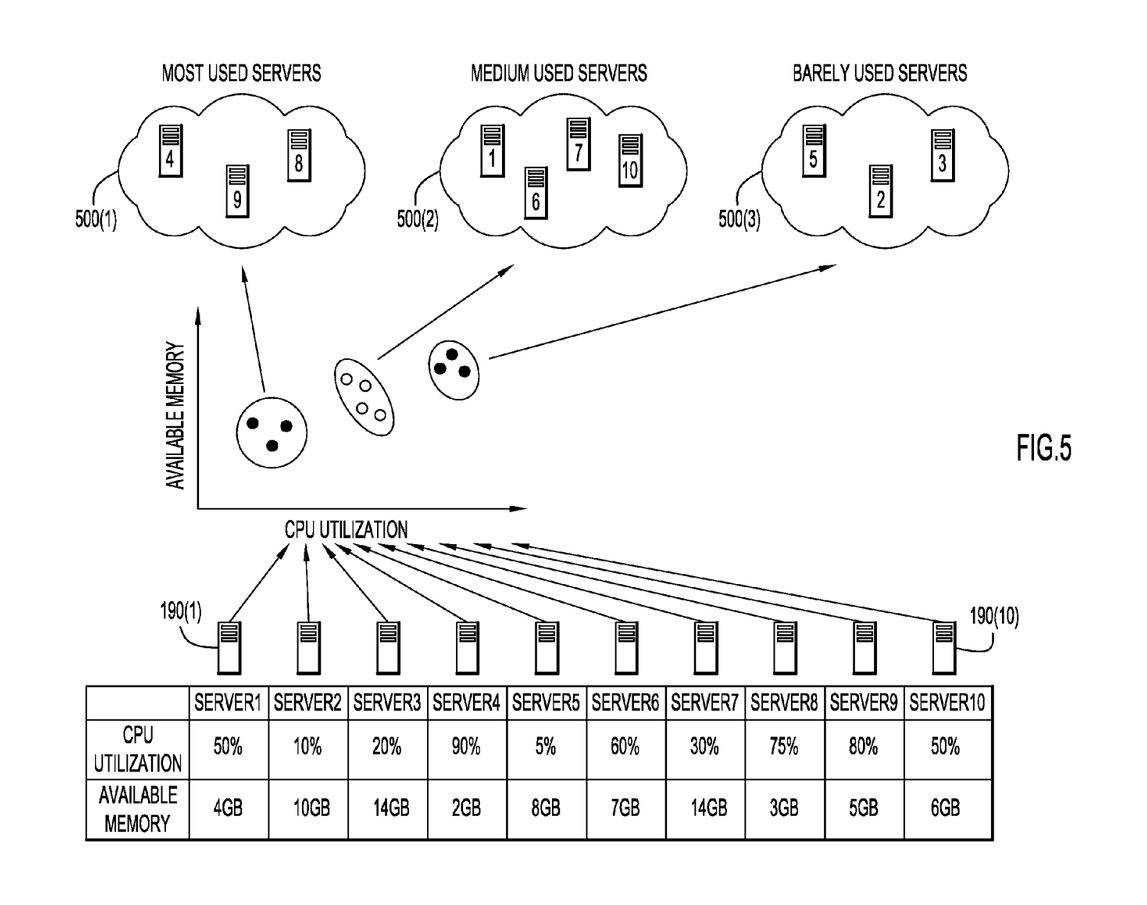
FIGS. 5 and 6 are diagrams that graphically illustrate examples of clustering-based resource aggregation for two different capability attributes.
Figure 6:
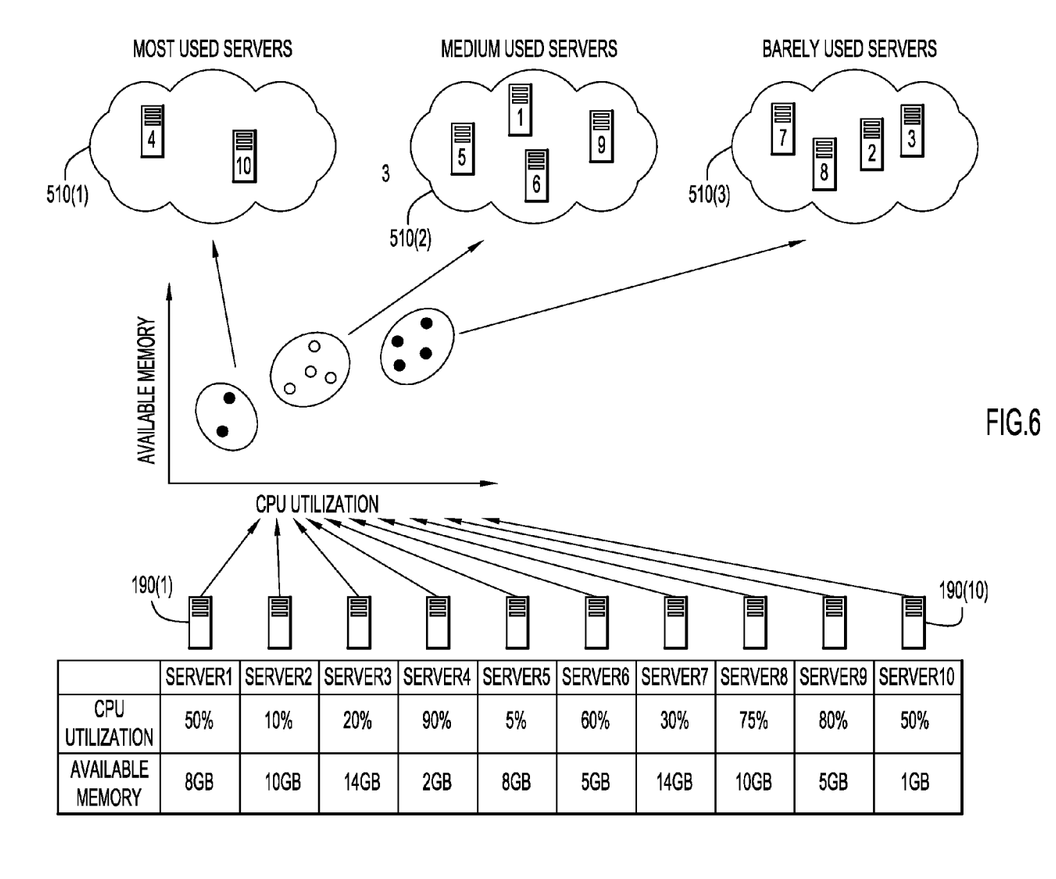

Reference is now made to FIGS. 5 and 6 for further examples of the clustering-based aggregation techniques. FIG. 5 shows an example in which clustering is performed based only on central processing unit (CPU) utilization or based on both CPU utilization and available memory, where CPU utilization is given a higher weighting than available memory. Shown at the bottom of FIG. 5 are 10 servers 190(1)-190(10). CPU utilization indicates how much of the overall computing power is actually being utilized by the server. For each server, data is shown indicating its CPU utilization and available memory. In this example, the number of clusters is 3, i.e., K=3, and there are two pieces of data for each server, i.e., N=2: CPU utilization and available memory.

The 3 groups or clusters are shown at 500(1), 500(2) and 500(3). Cluster 500(1) comprises servers that are "most used", cluster 500(2) comprises servers that are moderately or medium used, and cluster 500(3) comprises servers that are barely used. For example, based on the CPU utilization of the 10 servers in this example, cluster 500(1) has a minimum CPU utilization threshold of 75%, cluster 500(2) has a CPU utilization range of 30%-75% and cluster 500(3) is for CPU utilization less than 30%. These thresholds and ranges are only examples and are based on the CPU utilization of the servers 190(1)-190(10) at a given point in time. Servers 4, 8 and 9 are assigned to cluster 500(1), servers 1, 6, 7 and 10 are assigned to cluster 500(2) and servers 2, 3 and 5 are assigned to cluster 500(3).

FIG. 6 illustrates an example in which the same servers 190(1)-190(10) shown in FIG. 5 are clustered based only on available memory or based on both CPU utilization and available memory but available memory is given a higher weighting than CPU utilization. The three clusters are shown at 510(1), 510(2) and 510(3). Based on the available memory of the servers 190(1)-190(10), cluster 510(1) is dedicated to the most used servers, that is, servers with relatively little available memory, for example, less than 3 Gigabytes (GB). Cluster 510(2) is dedicated to moderately used servers, that is, servers with available memory between 4 GB and 8 GB. Cluster 510(3) is dedicated to least used servers, that is, servers with more than 8 GB of available memory. Servers 4 and 10 are assigned to cluster 510(1), servers 1, 5, 6 and 9 are assigned to cluster 510(2) and servers 2, 3, 7 and 8 are assigned to cluster 510(3).

Clustering-based aggregation of data center resources as described herein significantly reduces the amount of data that needs to supplied to a management or service-placement entity in a cloud computing system. These techniques also allow a network administrator (of the cloud computing system or service provider) to tailor the data in a manner that is best for the service-placement entity or management client.

The foregoing presents a mechanism to cluster data center resources into user-defined groups based on capability attributes, at a given time, of the data center resources. The attributes based on which the clustering-based aggregation is performed may be selected by a user. Clustering-based aggregation significantly reduces the amount of data that needs to be sent to other entities in the data center that make provisioning or placement decisions. It can provide for better visualization of the data center and more optimal service request placement. Clustering allows the user to tailor information about data center resources in a way that is suitable for any application. Clustering is computationally inexpensive compared to working with the entire data set of capabilities for data center resources. For example, in resource allocation, it is easier to match clusters of resources to requests than to analyze large lists of resource instances. In this sense, clustering takes into account load-balancing concerns when placement decisions are made in response to service requests.

As explained above, clustering may be based on more than one attribute, i.e., available uplink network bandwidth together with other metrics, such as computation or storage capabilities. Operations that could benefit from such "bandwidth-aware" clustering include resource placement, visualization, efficient methods for power reduction, etc.

In sum, a method is provided comprising receiving information representing capability attributes of devices in a data center; analyzing the information representing the capability attributes to generate data that groups devices based on similarity of at least one capability attribute; and storing aggregation data that represents the grouping of the devices based on similarity of the at least one capability attribute and identifies the devices in corresponding groups.

Similarly, an apparatus is provided comprising a network interface unit configured to enable communications over a network; and a processor coupled to the network interface unit and configured to: analyze information representing capability attributes of devices in a data center to generate data that groups devices based on similarity of at least one capability attribute; and store aggregation data that represents the grouping of the devices based on similarity of the at least one capability attribute and identifies the devices in corresponding groups.

Further still, provided herein is one or more computer readable storage media encoded with software comprising computer executable instructions and when the software is executed operable to: analyze information representing capability attributes of devices in a data center to generate data that groups devices based on similarity of at least one capability attribute; and store aggregation data that represents the grouping of the devices based on similarity of the at least one capability attribute and identifies the devices in corresponding groups.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
   receiving a plurality of capability attributes for each of a plurality of devices in a data center;
   receiving relative weights to be placed on the capability attributes for grouping;
   analyzing data representing each of the plurality of capability attributes associated with each of the plurality of devices in the data center using clustering techniques to group the plurality of devices into corresponding groups based on distances between vectors representing the plurality of capability attributes for the devices;
   grouping each of the plurality of devices into corresponding groups based on the analyzed data and based on the relative weights; and
   storing aggregation data that represents the grouping data and identifies the devices in the corresponding groups, wherein grouping further comprises:
      representing each of the plurality of devices as one of a plurality of N-dimensional data points in an N-dimensional graph, wherein each dimension is one of the plurality of capability attributes;
      receiving instructions to associate each of the plurality of N-dimensional data points with a cluster from K number of clusters;
      selecting a first N-dimensional data point from the plurality of N-dimensional data points as a first cluster center point;
      adding the first cluster center point to a set of cluster center points;
      selecting a second N-dimensional data point as a second cluster center point, wherein the second N-dimensional data point is a furthest distance on the N-dimensional graph from the set of cluster center points;
      adding the second cluster center point to the set of cluster center points;
      repeating selecting and adding cluster center points until there are K cluster center points, with each iteration selecting the N-dimensional data point that is the furthest distance from the set of cluster center points; and
      associating each of the plurality of N-dimensional data points with one of the K number of clusters based on distances to the nearest cluster center points and the relative weights to be placed on the capability attributes.

2. The method of claim 1, wherein receiving, grouping, and storing are performed in an aggregation switch device in the data center, and further comprising sending the aggregation data to another device at a higher hierarchical level in the data center in accordance with a clustering algorithm.

3. The method of claim 1, and further comprising receiving user input that specifies which two or more capability attributes are to be used for grouping devices into groups based on similarity of the two or more capability attributes.

4. The method of claim 1, and further comprising evaluating stored policy information to select one or more of: the capability attributes to be used for grouping devices, similarity/distance metrics to be used for grouping, a clustering algorithm to be used for grouping and relative weights to be placed on attributes used for grouping.

5. The method of claim 1, wherein grouping and storing are performed when a service request in the data center is provisioned or when operational properties of a device in the data center change.

6. The method of claim 1, wherein receiving comprises receiving data representing each of the two or more capability attributes associated with each of a plurality of devices in the data center, and wherein grouping comprises grouping devices that have a common set of capability attributes.

7. An apparatus comprising:
   a network interface unit configured to enable communications over a network; and
   a processor coupled to the network interface unit and configured to:
      receive a plurality of capability attributes for each of a plurality of devices in a data center;
      receive relative weights to be placed on capability attributes;
      analyze data representing each of the plurality of capability attributes associated with each of the plurality of devices in the data center using clustering techniques to group the plurality of devices into corresponding groups based on distances between vectors representing the plurality of capability attributes for the devices;
      group each of the plurality of devices into corresponding groups based on the analyzed data and based on the relative weights;
      represent each of the plurality of devices as one of a plurality of N-dimensional data points in an N-dimensional graph, wherein each dimension is one of the plurality of capability attributes;
      receive instructions to associate each of the plurality of N-dimensional data points with a cluster from K number of clusters;
      select a first N-dimensional data point from the plurality of N-dimensional data points as a first cluster center point;
      add the first cluster center point to a set of cluster center points;
      select a second N-dimensional data point as a second cluster center point, wherein the second N-dimensional data point is a furthest distance on the N-dimensional graph from the set of cluster center points;
      add the second cluster center point to the set of cluster center points;
      repeat the selecting and adding cluster center points until there are K cluster center points, with each iteration selecting the N-dimensional data point that is the furthest distance from the set of cluster center points;

associate each of the plurality of N-dimensional data points with one of the K number of clusters based on distances to the nearest cluster center points and the relative weights to be placed on the capability attributes; and store aggregation data that represents the grouping data and identifies the devices in the corresponding groups.

8. The apparatus of claim 7, wherein the processor is further configured to send the aggregation data via the network interface unit to another device at a higher hierarchical level in the data center in accordance with a clustering algorithm.

9. The apparatus of claim 7, wherein the processor is further configured to group the devices based on user input that specifies which two or more capability attributes are to be used for grouping devices into groups based on similarity of the two or more capability attributes.

10. The apparatus of claim 7, wherein the processor is configured to analyze data representing each of the two or more capability attributes associated with each of a plurality of devices in the data center to group devices that have a common set of capability attributes.

11. The apparatus of claim 7, wherein the processor is configured to evaluate stored policy information to select one or more of: the capability attributes to be used for grouping devices, similarity/distance metrics to be used for grouping of devices, the clustering algorithm to be used for grouping and relative weights to be placed on attributes for grouping.

12. One or more non-transitory computer readable storage media encoded with software comprising computer executable instructions and when the software is executed operable to:

receive a plurality of capability attributes for each of a plurality of devices in a data center;

receive relative weights to be placed on the capability attributes for grouping;

analyze data representing each of the plurality of capability attributes associated with each of the plurality of devices in the data center using clustering techniques to group the plurality of devices into corresponding groups based on distances between vectors representing the plurality of capability attributes for the devices;

group each of the plurality of devices into corresponding groups based on the analyzed data and based on the relative weights;

represent each of the plurality of devices as one of a plurality of N-dimensional data points in an N-dimensional graph, wherein each dimension is one of the plurality of capability attributes;

receive instructions to associate each of the plurality of N-dimensional data points with a cluster from K number of clusters;

select a first N-dimensional data point from the plurality of N-dimensional data points as a first cluster center point;

add the first cluster center point to a set of cluster center points;

select a second N-dimensional data point as a second cluster center point, wherein the second N-dimensional data point is a furthest distance on the N-dimensional graph from the set of cluster center points;

add the second cluster center point to the set of cluster center points;

repeat selecting and adding cluster center points until there are K cluster center points, with each iteration selecting the N-dimensional data point that is the furthest distance from the set of cluster center points;

associate each of the plurality of N-dimensional data points with one of the K number of clusters based on distances to the nearest cluster center points and the relative weights to be placed on the capability attributes; and store aggregation data that represents the grouping data and identifies the devices in the corresponding groups.

13. The non-transitory computer readable storage media of claim 12, and further comprising instructions that are operable to receive user input that specifies which two or more capability attributes are to be used for grouping devices into groups based on similarity of the two or more capability attributes.

14. The non-transitory computer readable storage media of claim 12, and further comprising instructions that are operable to evaluate stored policy information to select one or more of: the attributes to be used for grouping devices, similarity/distance metrics to be used for grouping of devices, the clustering algorithm to be used for grouping and relative weights to be placed on attributes for grouping.

* * * * *